US006525731B1

(12) United States Patent
Suits et al.

(10) Patent No.: US 6,525,731 B1
(45) Date of Patent: Feb. 25, 2003

(54) DYNAMIC VIEW-DEPENDENT TEXTURE MAPPING

(75) Inventors: Frank Suits, Garrison, NY (US); James T. Klosowski, Rye, NY (US); William P. Horn, Scarsdale, NY (US)

(73) Assignee: IBM Corporation, Yorktown Heights, NY (US)

( * ) Notice: Subject to any disclaimer, the term of this patent is extended or adjusted under 35 U.S.C. 154(b) by 0 days.

(21) Appl. No.: 09/436,904

(22) Filed: Nov. 9, 1999

(51) Int. Cl.[7] .............................................. G06T 15/20
(52) U.S. Cl. ....................................... 345/427; 345/421
(58) Field of Search ................................. 345/419, 426, 345/428, 619, 427, 421

(56) References Cited

U.S. PATENT DOCUMENTS

| | | | |
|---|---|---|---|
| 5,561,745 A | 10/1996 | Jackson et al. | 395/119 |
| 5,699,497 A | 12/1997 | Erdahl et al. | 395/128 |
| 5,710,875 A | 1/1998 | Harashima et al. | 345/419 |
| 5,805,782 A | 9/1998 | Foran | 395/126 |
| 6,072,496 A * | 6/2000 | Guenter et al. | 345/419 |
| 6,289,380 B1 * | 9/2001 | Battat et al. | 709/224 |
| 6,307,567 B1 * | 10/2001 | Cohen-Or | 345/619 |
| 6,320,596 B1 * | 11/2001 | Bestimt et al. | 345/619 |

OTHER PUBLICATIONS

Blinn, James F., et al., *Texture and Reflection in Computer Generated Images*, Communications of the ACM, vol. 19, No. 10, (1976), pp. 542–547.
Chen, Shenchang Eric., *View Interpolation for Image Synthesis*, Computer Graphics Proceedings, Annual Conference, Proceedings of SIGGRAPH, 1993.
Cignoni, P., et al., *A General Method for Preserving Attribute Values on Simplified Meshes*, Proceedings of IEEE Visualization, pp. 59–66, 1999.
Lippman, Andrew, *Movie–Maps: An Application of the Optical Videodisc to Computer Graphics*, Proceedings of SIGGRAPH, 1980.
de Oliveira, Manuel, et al., *Dynamic Shading in ImageBased Rendering*, UNC Computer Science Technical Report, TR98–023, May 31, 1998.
de Oliveira, Manuel, et al., *Image–Based Objects*, 1999 Symposium on Interactive 3D Graphics, Atlanta, Georgia.
Rademacher, Paul, et al., *Multiple–Center–of–Projection Images*, Computer Graphics Proceedings, Annual Conference Series, ACM SIGGRAPH, pp. 199–206, 1998.
Rafferty, Matthew M., et al., *Images for Accelerating Architectural Walkthroughs*, Computer Graphics & Applications, Nov./Dec. 1998.

* cited by examiner

Primary Examiner—Mark Zimmerman
Assistant Examiner—Lance W Sealey
(74) Attorney, Agent, or Firm—Dilworth & Barrese, LLP

(57) ABSTRACT

A system for providing interactive views of 3-dimensional models with surface properties is disclosed. The system provides a compact representation of a 3D model and its surface features and provides for efficiently viewing and interacting with the model using dynamically switched texture maps. The compact representation is beneficial for transmission of the model across a network as well as for local storage of the model in the computer memory. The dynamically switched texture maps allow for more accurate surface details on the 3D model, as well as speedy interaction between a user and the 3D model.

20 Claims, 15 Drawing Sheets

Camera 1's view of the 3D model 3D model geometry 501     Rendered image of complete model 502

FIG. 5a          FIG. 5b

The texture mapped 3D model, with occluded regions colored black

Curved arrows show texture coordinates for a visible triangle and a partially occluded triangle. Occluded and backfaced triangles point to an unused region of the image.

View slightly away from camera 1 reveals
backfacing and occluded regions

3D Model with
Surface Features 200

Rotating further, the view direction is now closest to camera 2 and camera 2's image is used for the texture map.

Data Structure for View Camera

901 Eye Point
902 View Point or Direction
903 Perspective or Orthographic
904 View Angle or View Width
905 X and Y Pixel Count
906 Up Direction

DYNAMIC VIEW-DEPENDENT TEXTURE MAPPING

BACKGROUND OF THE INVENTION

1. Field of the Invention

This invention relates to computer-generated graphics and interactive display systems in general, and, in particular, to the generation of three-dimensional imagery using an efficient and compact form.

2. Description of the Related Art

The use of 3D imagery, whether displayed on a screen or in virtual reality goggles, is becoming increasingly important to the next generation of technology. Besides CAD/CAM (Computer Aided Design/Computer Aided Modelling), 3D imagery is used in videogames, simulations, and architectural walkthroughs. In the future, it may be used to represent filing systems, computer flowcharts, and other complex material. In many of these uses, it is not only the image of a 3D model that is required, but also the ability to interact with the image of the 3D model.

The process of creating and displaying three-dimensional (3D) objects in an interactive computer environment is a complicated matter. In a non-interactive environment, 3D objects require memory storage for the shape, or geometry, of the object depicted, as well as details concerning the surface, such as color and texture. However, in an interactive environment, a user has the ability to view the 3D object from many angles. This means that the system has to be able to generate the images of geometry and surface details of the 3D object from any possible viewpoint. Moreover, the system needs to generate images from these new viewpoints quickly, in order to maintain the sensation that the user is actually interacting with the 3D object.

As an example, consider viewing a 3D model of a house on a computer system with a monitor and a joystick. Although you may be viewing it on the flat computer screen, you will see the shape of the house, the black tiles on the roof, the glass windows, the brick porch, etc. But if you indicate "walk to the side" by manipulating the joystick, the viewpoint on the screen shifts, and you begin to see details around the side corner of the house, such as the aluminum siding. The system needs to keep up with your manipulations of the joystick, your "virtual movement," in order to provide a seamless, but continuously changing image of the 3D object, the house. So the system needs to redraw the same object from a different perspective, which requires a large amount of memory and a great deal of processing.

The problem of memory usage becomes even more acute when in a networked environment, where the image is being shown on a client system, while the original 3D object information is stored on a server. The client display system will have to receive the 3D object information over a communication link, thereby slowing down the process. In most cases, a compromise will have to be made between the interactive speed, how quickly the display will redraw based on user input, and the accuracy of the 3D object, how many details can be recalculated with each change in perspective. Although the following discussion will assume a networked environment, the problems addressed are also applicable to stand-alone computer systems, since an analogous situation exists between the hard drive (server) and the local memory (client) in a computer.

Before addressing the memory and processing problems, a brief discussion of 3D imaging is in order. As indicated above, the features of 3D objects can be separated into geometry, the shape and volume of the object, and surface details, such as texture, color, and shading. The first issue is how these two attributes, geometry and surface details, are stored and transmitted. The storage of geometry involves the description of the various edges and vertices of the object in 3D space. One way to speed the network time of transmitting and displaying a 3D object is to simplify the geometry, but this can make it hard to represent the original surface information on the reduced geometry, as the vast majority of simplification algorithms use only a geometric approximation and ignore the importance of surface details. A technique such as "texture mapping" [Blinn] maps an image of the rendered object onto the simplified geometry, but it is difficult to create and map images onto a surface of arbitrary topology. Furthermore, the corresponding texture coordinates would have to be sent along with the model, which would increase the transmission load.

Texture mapping is one of a class of techniques called "image-based rendering," where an image of the surface details are "rendered" for each new perspective on the 3D object. Every time the user moves around the 3D object, a new surface image must be "rendered" from the new perspective. The image of surface details is taken and stored in various ways. One approach, which is used in texture mapping, is to break the surface of the 3D object into polygons, render every surface polygon as a small image, and then assemble all the images into a large montage that acts as a single texture image for the entire surface [Cignoni98]. Each polygon would then appear fully rendered and without any occlusion somewhere in the montage image, and the corresponding texture coordinates of the polygon corners would be well-defined. Occlusion occurs when some surface details are blocked from the user's perspective. Also in this approach is a method that packs the images into the montage efficiently to minimize wasted space in the texture image.

There are other approaches to taking a surface detail image. A single texture image of an object can be created by doing a "flyover" of the 3D object. This is equivalent to passing a camera over every surface of the object and taking pictures either continuously, creating one large seamless image, or discretely, creating multiple images corresponding to coverage of the entire 3D object.

Some image-based rendering techniques use these surface detail images directly as hardware texture maps [Cignoni98, Rademacher, Foran98, Erdahl97, Jackson96]; in other words, they use one or more images to completely describe the texture of the 3D object from any perspective the user may take. Others rely on data structures and algorithms that are implemented in software [Harashima98, Oliveira98, Oliveira99]; meaning that new perspectives are created or interpolated from image data by computer processing. Furthermore, some approaches are optimized for creating as realistic view as possible from a finite set of images, while others seek a compromise between accuracy and interaction speed.

There are many problems of memory usage, data transmission and excessive processing when employing the above techniques. For instance, the image-based rendering techniques that rely extensively on software algorithms to perform elaborate operations during every change of viewpoint are inapplicable to CAD/CAM and related applications that demand both high performance and high accuracy. This is even more of a problem in client-server applications in which the client may be much less powerful than the server machine. For the rest of this application, we will focus on texture mapping as the best technique for a client-server application.

When using texture mapping over a client-server/ networked system, there is the need to send additional information such as texture coordinates, details, and color along with the geometry. To reduce bandwidth requirements it is important to send as little data as possible while still allowing the client to reconstruct the scene. However, this is a problem with complex rendering processes that don't reduce to simple 2D renderings of a 3D object with a given viewpoint. Complex rendering requirements will more tightly couple the process that creates the viewable geometry with the process that renders the images, which is inappropriate, for example, when the creation process is performed on the server and the rendering process is performed on the client. Thus, in a client-server system, multiple 2D renderings or multiple texture maps of the 3D object are preferable.

When using the polygon method of texture mapping, multiple images are used to represent the surface of an object at the same time. In this situation, any difference in rendering parameters between images may result in a discontinuity between regions that can stand out as a disturbing artifact. Surfaces that do not appear seamless may be hard to interpret because the eye is drawn to the abrupt changes in surface characteristics rather than the actual features on the surface.

If, in a client-server system, the server performs the original rendering, and transmits it to the client, the client is stuck with the conditions of the original rendering. For instance, if a server renders the 3D object with a light source, resulting in shading, the client is unable to change the shading on the renderings it receives from the server. The inability of the client to view the object under different lighting and shading conditions may limit the applicability of the technique, particularly when multiple objects rendered under different conditions are collected in a single scene that has a different type of lighting.

When it is important to view the facets of a model, and yet have the client display simplified geometry, there is a fundamental problem in showing individual surface details of the original geometry using only simplified geometry. This is particularly a problem when showing shading on the facets, since if the lighting is done on the client side there is no way to subdivide a polygon into the polygons in the original model.

SUMMARY OF THE INVENTION

An object of this invention is to provide an improved system and method for representing a 3D model with surface features in a compact form.

Another object of this invention is to provide a system and a method for representing a 3D model with surface features in a compact form for rapid transmission over a network and/or for storage in computer memory.

Another object of this invention is to provide a system and a method for representing a 3D model with one surface texture at a time, thus eliminating discontinuities in surface features between regions of the 3D model.

Another object of the invention is to provide a system for interactively viewing a 3D model in an efficient manner using simplified geometry while displaying the appearance of the original model using the original surface features, including original connections and shading.

Another object of the invention is to enable a client to recreate a 3D model with a minimum of transmitted information across a network, particularly without the need to receive texture coordinates to map the images onto the geometry of the model.

To accomplish the above and other objects, a server renders a 3D model, described using geometry and surface features, from a number of viewpoints. These image renderings, or "camera views," contain the original detailed facets of the original model on the server. The data concerning the "camera position" of each viewpoint is also saved with each "camera view." The geometry of the original model is simplified to reduce the amount of information that needs to be sent across the network.

The simplified model, the rendered images, and the camera orientations are sent to a remote client that dynamically texture maps the best image based upon the current view direction. A pre-processing stage determines which portions of the model's geometry are occluded from a given view direction and colored accordingly, to indicate that the texture information for these portions are invalid. Because there are multiple texture maps for the same model, a given spot on the model is typically depicted in more than one texture map. As the object is rotated to different view directions, the texture map changes, giving the impression that the entire object has been texture mapped.

By separating the pure geometrical component of the model from all the data and surface features that contribute to its rendered appearance, the client need only be able to drape a texture onto a geometric mesh to recreate the rendered appearance on the client. The server need only create a few images of the model from a view camera direction, and the client need only receive the (possibly simplified) geometry of the model without any additional surface data or annotations that are represented in the texture images. The client is both thin and generic, because all the specifics of rendering a model remain the job of the server application.

BRIEF DESCRIPTION OF THE FIGURES

The foregoing and other objects, aspects and advantages will be better understood from the following detailed description of preferred embodiments of the invention with reference to the following drawings:

FIGS. 5a–5c are an illustration of how a client maps the 3D model's geometry (FIG. 5a) onto the 2D rendered image (FIG. 5b) to create a rotatable 3D textured object (FIG. 5c) that shows partially occluded triangles, according to an embodiment of the present invention;

FIG. 9 is an illustration of the parameters that comprise the data structure for a view camera, whereby the parameters provide enough information to specify how to render a 3D scene into a 2D image in terms of the geometric mapping of the 3D geometry to the 2D location in the image, according to an embodiment of the present invention;

DETAILED DESCRIPTION OF THE PREFERRED EMBODIMENTS

In the following description, we assume a client-server system, although, as stated above, the ideas are applicable to a stand-alone computer system.

In a preferred embodiment, a server stores the original 3D object data, including geometry and surface features. The server also has a rendering function, which can be applied to the stored 3D object data to create texture maps from particular viewpoints. A network connects the server to the client. The client has a display and the ability to take input from a user in order to alter the display. The server sends data, including texture maps and geometry, about the 3D object over the network to the client, and the client stores and processes that data in order to provide interactivity with the user.

Figure 2:
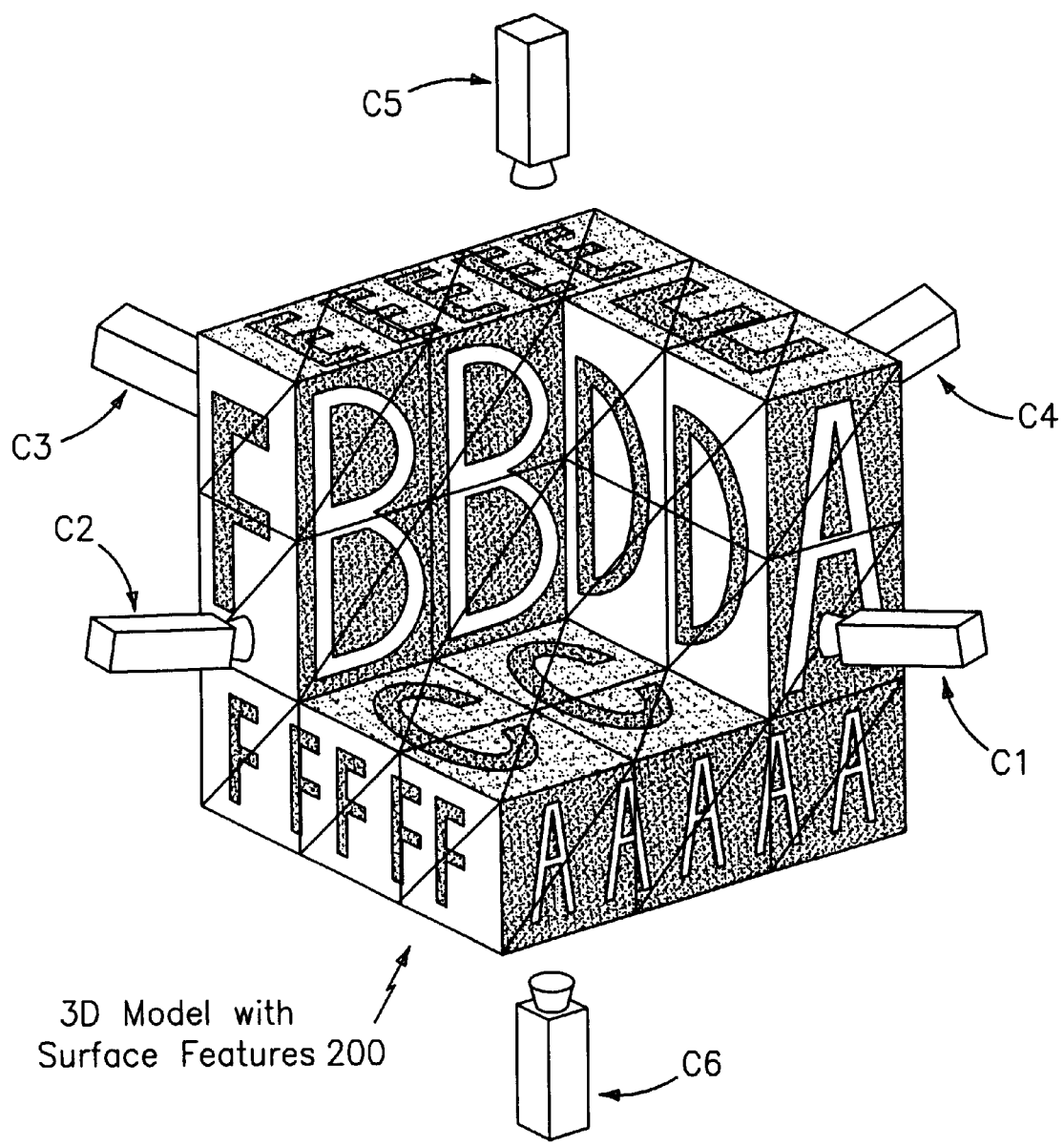
FIG. 2 is a view of a 3D model with surface features, shown together with camera view directions, according to an embodiment of the present invention.

In the preferred embodiment, the steps involved are as follows:

First, on the server side, a number, N, of cameras based on the 3D object's shape and relevant features is generated. For example, on a cube, six views, one from each of the directions around a cube, may be generated, as shown in FIG. 2. Images of the model using each of the cameras are created. For the rest of this application, the term "camera" or "view camera" in relation to data will signify the information identifying each of these N cameras: location, direction of viewpoint, view angle, up direction, etc. If desired, the geometry of the model is simplified. The simplified geometry, the view cameras for the series of images, and the images themselves are sent to the client. Note that the view cameras contain a small amount of data and do not contribute significantly to the data that are sent.

Second, the client receives the simplified geometry, cameras, and images and performs a pre-processing step, once per camera. Based on the geometry and a given camera, a visibility algorithm decides which portions of the model's geometry are fully visible in the image and which are either backfacing or partially occluded by other geometry. The corners of the fully visible portions of geometry are mapped into texture coordinates corresponding to the current image and camera, while the corners of the remaining geometry are assigned a unique value corresponding to an empty region of the image. One or more of the pixels in the empty region of the image are assigned to a color to convey the lack of texture image data for this particular view direction. The pre-processing step runs once per camera and results in N sets of texture coordinates for the simplified geometry.

Third, in order to show the model in an interactive manner, the client display system chooses an initial view direction and determines the camera whose orientation most closely matches it. The system displays the simplified geometry using the texture image and coordinates fitting that camera. As the user rotates and interacts with the object, the system calculates which camera is the best match to the current view orientation. When the best matching camera is different from that of the current texture map, the new texture image and coordinates are swapped in.

From this overview, additional advantages of the techniques of the present invention are clear. When creating the original images of the 3D model on the server, rendering the surface details of the model's original geometry allows the client to view the original surface details on the surface of simplified geometry. This results in the client having a more accurate view of the model, even though only simplified geometry is being used on the client's computer.

In the above description, it is assumed the original rendering by the server was done with no shading, i.e. all surfaces were lit up equally. However, to provide the client with additional visual cues, the server can render the 3D model with shading turned on. As the client is interactively viewing the textured model, direct illumination can be turned off, thereby allowing the client to see the shading of the original model on the simplified geometry. This additional information may have a slight drawback in that the light on the client will move with the object as the object rotates, and will jump to a new position when the texture map changes. However, the result is a rotatable model with highly accurate shading that rotates quickly on the client side because it has simplified geometry. Such quick rotation was not possible with the prior art techniques that map the entire object to a single, complicated texture image, rather than the various camera views of the present invention.

Figure 1A:
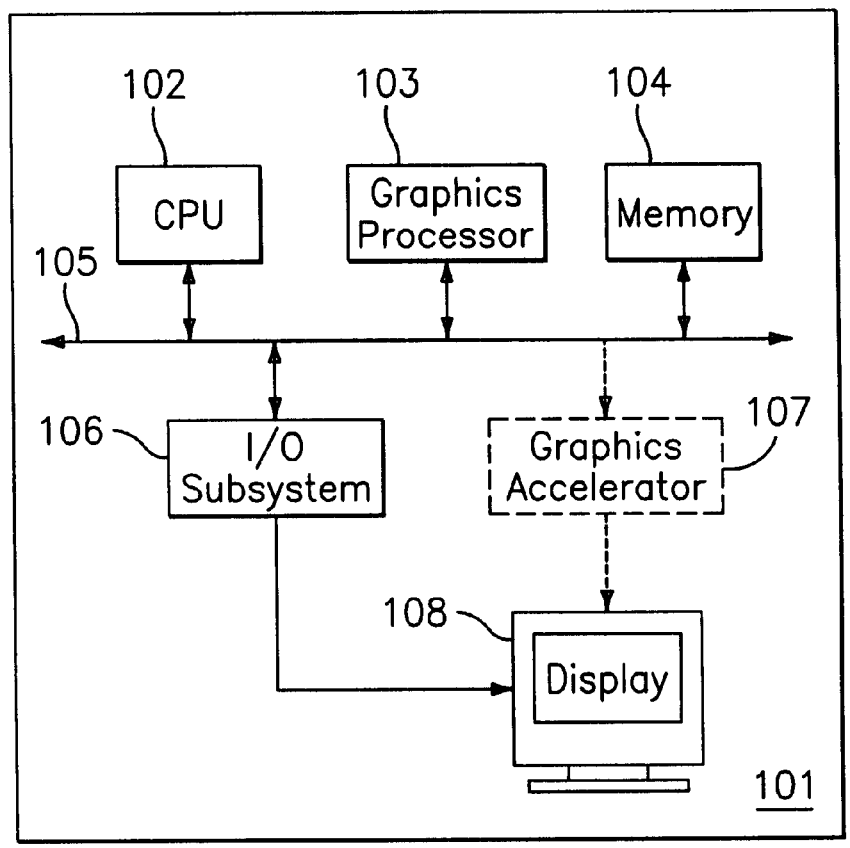
FIG. 1a is a block diagram of a preferred system embodying the present invention.
Figure 1B:
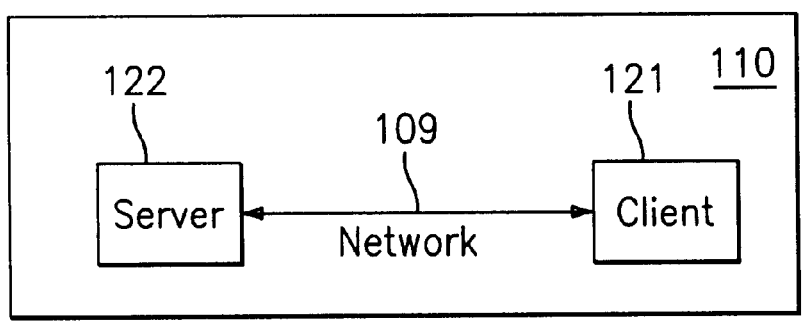
FIG. 1b is a block diagram of a client-server architecture.

FIG. 1 is a block diagram showing an overview of a typical networking environment using the present invention. The figure describes a system 110 comprising a server computer 122, a computer network 109, and a client computer 121. The server and client each further comprise a memory 104 where one or a plurality of geometric models are stored. A CPU 102 accesses the model via the internal bus 105 and assists a graphics processor 103 in rendering the image and conveying it via the I/O subsystem 106 and the graphics accelerator 107 to the display 108.

FIG. 2 shows a 3D object 200 with surface features surrounded by symbols representing six cameras C1–6 used to view the surface of the object. Since this model has an approximately cubic shape with many square features, the cameras were located slightly offset from the x and y directions in order to avoid view directions containing surface planes that are viewed edge-on. The six cameras include four that go around the cube from slightly above the horizontal plane, plus two more that look on to the top and bottom of the model. The exact number and location of cameras is not critical, although important regions on the model surface should have a camera that renders them well in an image.

Figure 3:
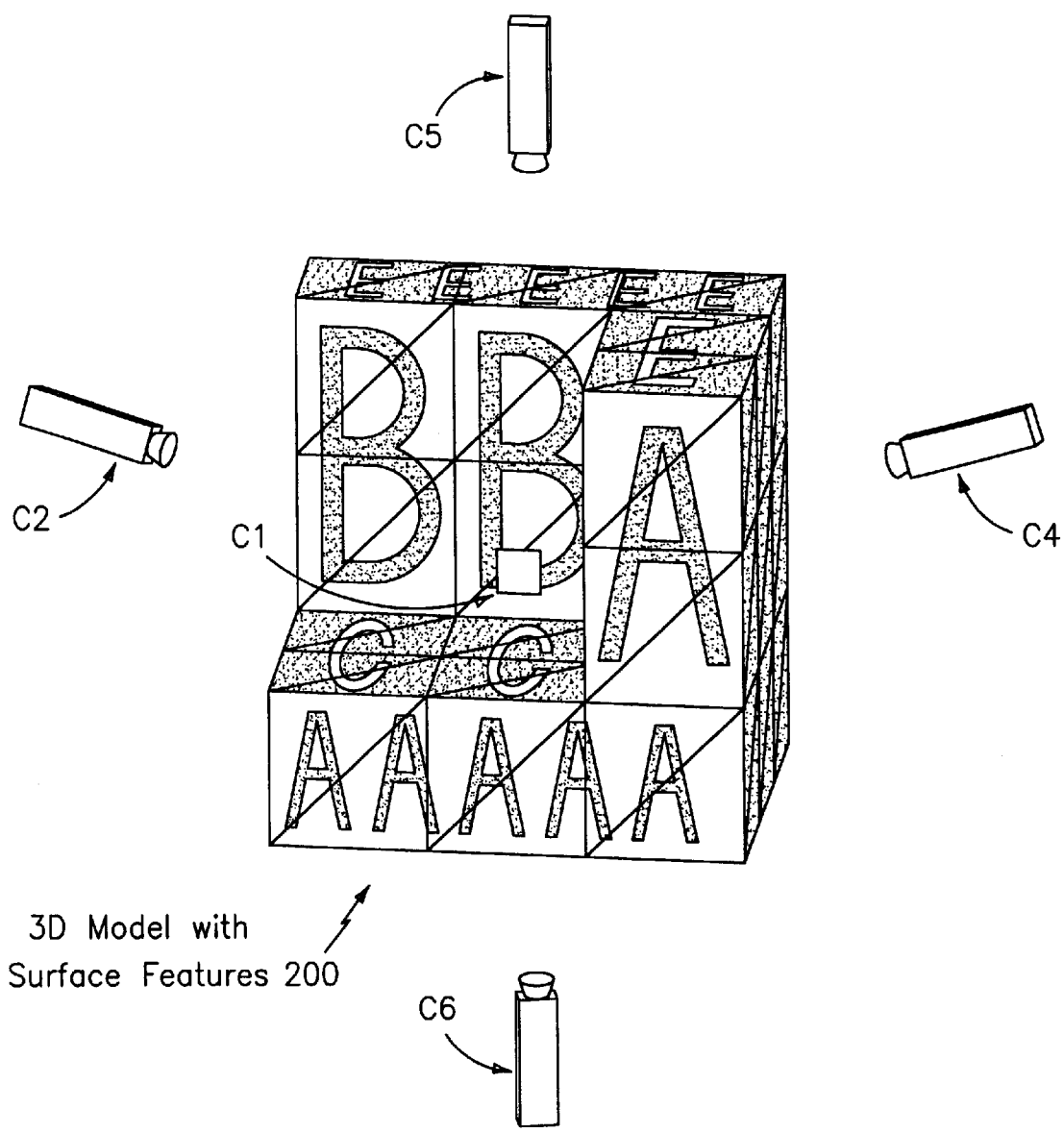
FIG. 3 is a rendered image of the 3D model of FIG. 2 corresponding to one of the view directions (orientations), according to an embodiment of the present invention.

FIG. 3 shows the 3D model 200 again, along with the six cameras C1–6. This view is directly along the direction of camera one C1 and shows the corresponding image obtained by rendering the 3D model with camera one C1. The image conveys that the camera is looking slightly down on the cube and slightly off the right side. This is one of the images that the client will use when displaying the 3D geometry using a texture map.

Figure 4:
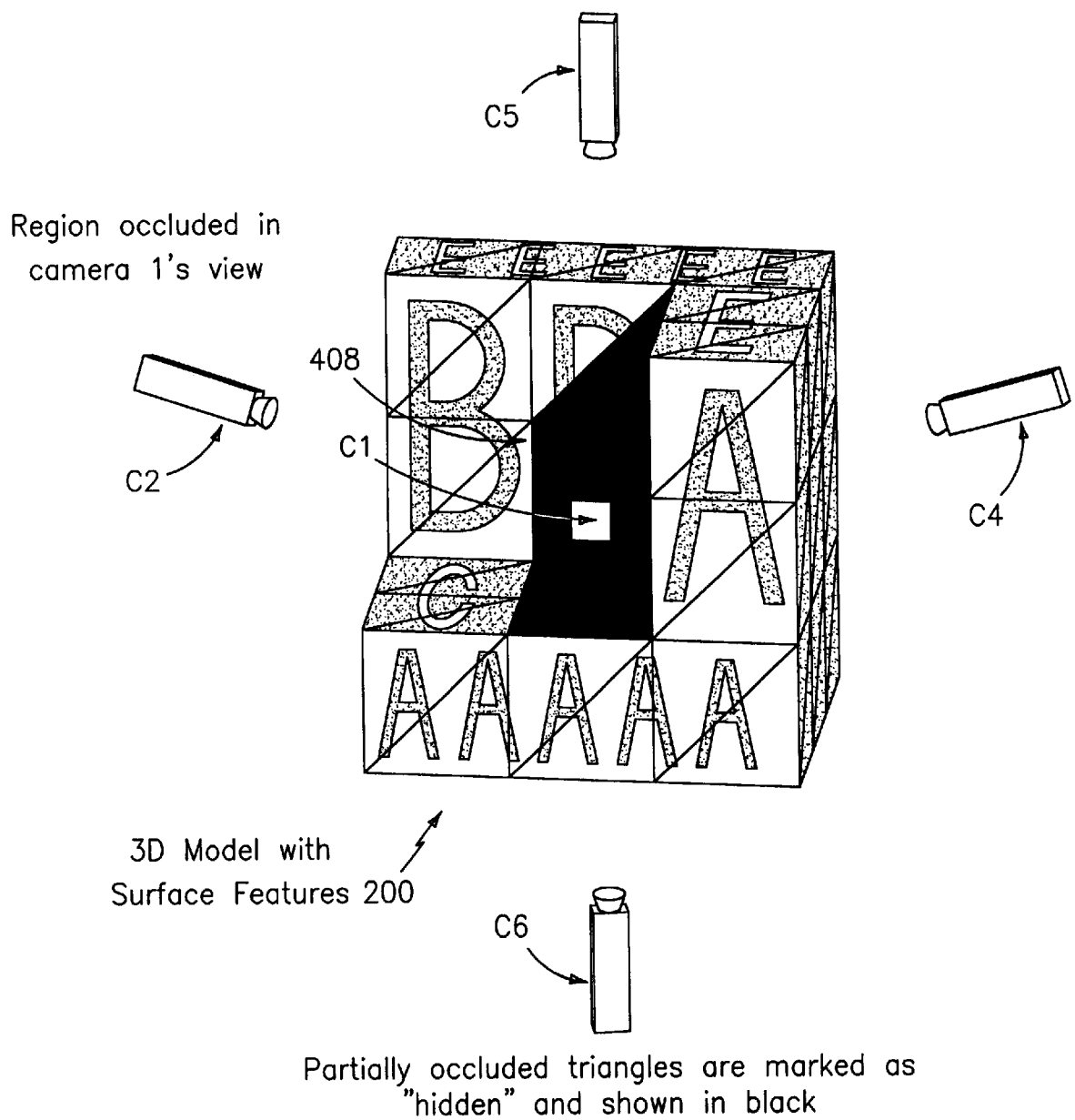
FIG. 4 is a rendered image of the 3D model of FIG. 2 using the view orientation of FIG. 3, and showing occluded regions from this orientation in black, according to an embodiment of the present invention.

FIG. 4 is the same as FIG. 3 except that the polygons occluded by part of the model are colored black. The 3D model 200 is shown in the context of the six cameras C1–C6 while region 408, which is partially occluded by the forward projecting right side of the cube, is colored black.

When a 3D geometric model is texture mapped with a 2D image, the corners of each polygon in the model are assigned a 2D coordinate, often denoted (u,v), where $0 \leq u \leq 1, 0 v \leq 1$. The (u,v) coordinate represents the (x,y) location of the polygon corner relative to the lower left corner of the texture image, where u is the x location normalized to the image width and v is the y location normalized to the image height. The process of texture mapping an object involves creating images of the object and then calculating (u,v) for each of the polygon corners.

Figure 5C:
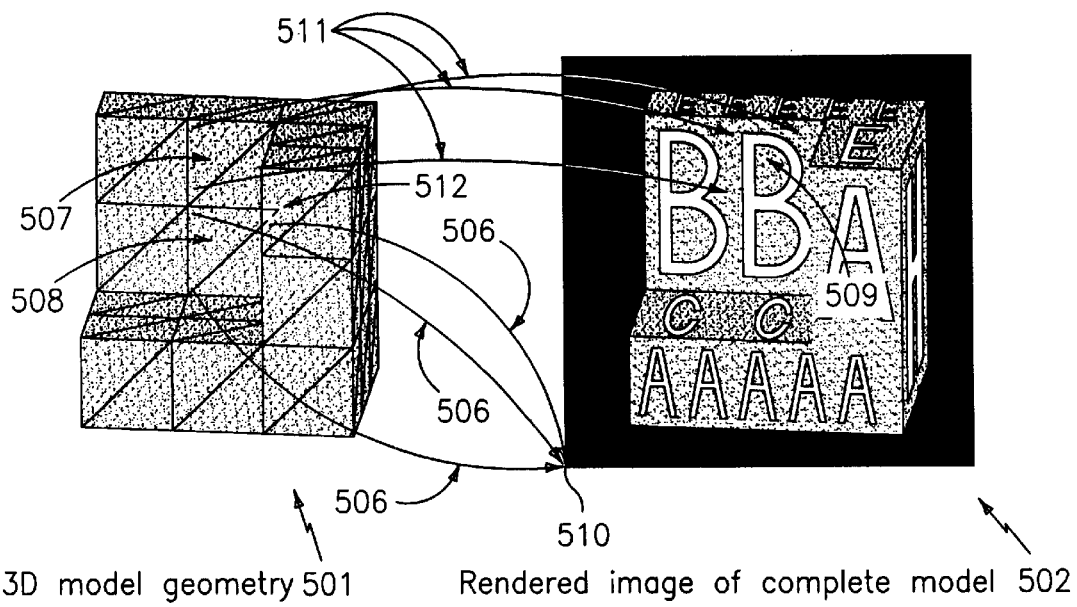
Figure 5C:
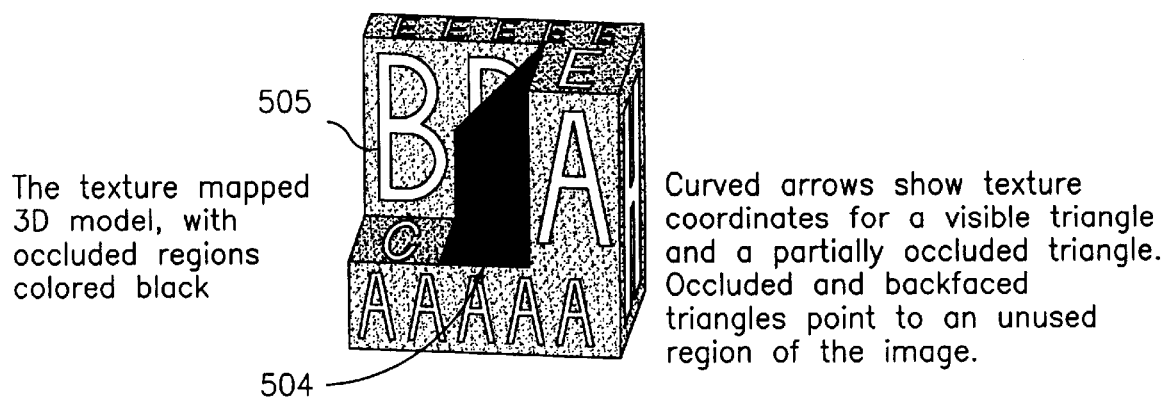

FIG. 5 details how the geometric coordinates of the model are texture mapped using the image with consideration for occluded regions of the surface. 501 and 502 show the separate features that make up the 3D object: geometry 501 and a rendered image 502 of the surface details. The rendered image of the original model 200 is taken from the viewpoint of camera one C1, without any occlusion, as in FIG. 3. The unused areas that are outside the bounds of the original model 200 are black in 502. In this case and in many applications, the rendered image will have an empty border of unused pixels around it, guaranteeing that the image corners will be unused; i.e., they will not correspond to the surface of the model. In 501 the polygon connections are shown schematically as struts connecting the vertices to show the exact location of the polygons of the model, although they do not appear in the rendering 502.

In order to texture map the image 502 onto the geometry 501 and accommodate occlusion, an unused region of 502 must be identified and a pixel assigned to represent the color of occluded polygons. In the rendered image 502, the lower left corner pixel 510 is designated as the pixel to be used for coloring occluded regions and will be used as the texture coordinate of polygons with occluded corners. The lower left corner pixel is black so the occluded regions will also be black. Alternatively, if no unused pixel is available or if the identification of an unused pixel is problematic, an additional row of pixels may be added to the image to create an unused region of the image for texture mapping the occluded and backfacing parts of the model.

With continued reference to FIG. 5, two polygons 507 and 508 (in this case, triangles) are shown texture mapped into the image 502. Polygon 507 is fully visible in this view so its corners are projected into the image as shown by the curved arrows 511. In the image 502 is a polygonal patch 509 with a section of a 'B' corresponding to the surface detail that will cover the visible polygon 507. In contrast, the partially occluded polygon 508 has a corner 512 that is occluded by part of the model in this view. Any polygon with at least one corner occluded will be incorrectly texture-mapped with surface information due to the occluding polygons, which means that occluded polygons such as 508 must be treated specially to indicate the lack of good texture information across the entire polygon.

The preferred embodiment texture maps the entire polygon to a special pixel in the image that has been colored to indicate "no texture information available in this view," which produces a natural appearance of the model 505 similar to having a shadow cast on the object where no features are visible 504. The fact that one texture map is coloring the entire surface including the occluded and backfacing regions, and that the geometry on which the texture map is draped has been simplified, guarantees a highly interactive view of the model while maintaining surface detail comparable to the original model.

Figure 15:
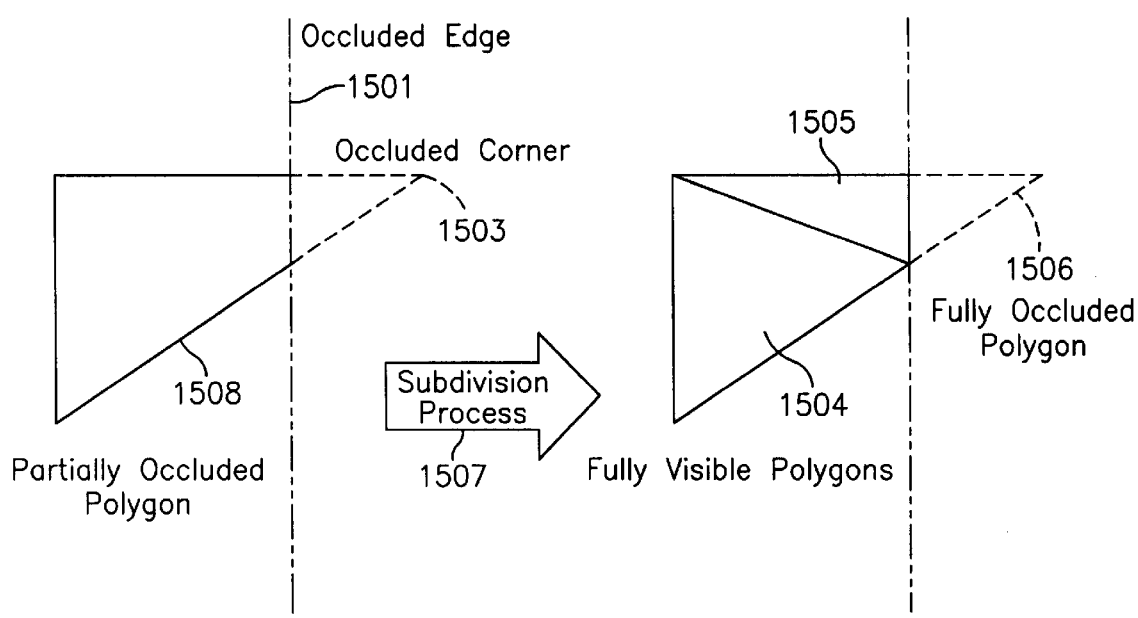
FIG. 15 corresponds to a close-up of the occluded polygon in FIG. 5, and depicts the algorithm for subdividing partially occluded polygons into polygons that are either fully occluded or fully visible, according to an embodiment of the present invention.

To reduce the size of the shadows caused by occlusion the client can subdivide the partially occluded polygon into fully visible and fully occluded polygons, as depicted in FIG. 15, which corresponds to a close-up view of the partially occluded polygon 508 in FIG. 5. In FIG. 15, a polygon 508 is partially occluded by an edge of the geometry, which leaves one corner 1503 hidden. The subdivision process 1507 subdivides the occluded polygon into three—two fully visible polygons 1504 and 1505 and a fully occluded polygon 1506. This has the benefits of reducing the size of the shadowed regions, forcing them to match the appearance of the true shadow cast by occluding edge (which may appear more natural), and of not throwing away any parts of the image that have usable texture information. The drawbacks are additional pre-processing for the client to do to subdivide the partially occluded polygons, along with the rendering expense of having more polygons in the displayed geometry.

Figure 6:
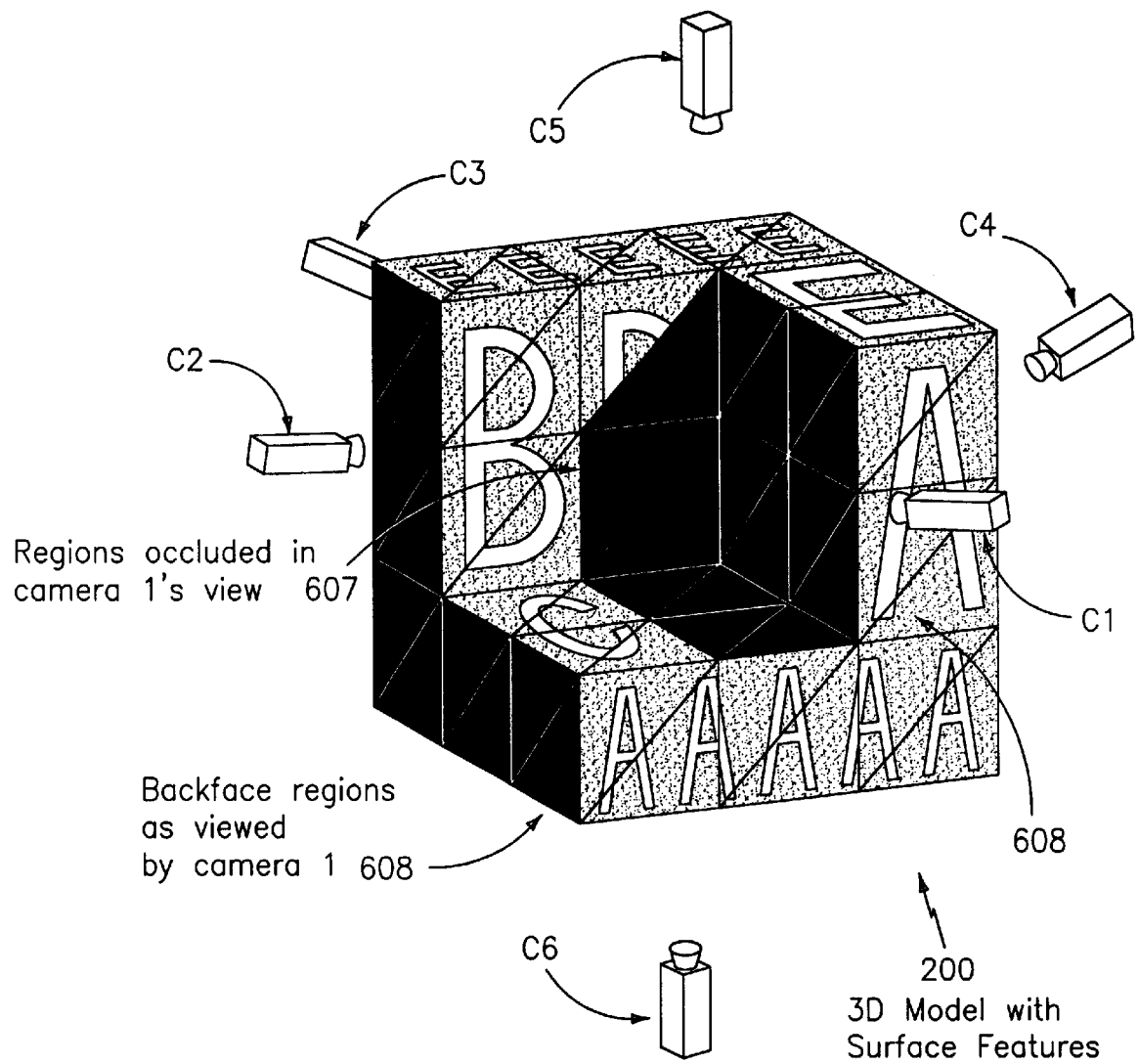
FIG. 6 is a rotated view of the 3D textured object of FIG. 5c viewed from the first camera and revealing backfacing and occluded regions, according to an embodiment of the present invention.

FIG. 6 is a view of the model 200 after the client rotates the object to the right in the horizontal plane. After a small rotation the texture map remains the same and backfacing regions 608 are now exposed to view, while the occluded region 607 simply rotates with the object.

Figure 7:
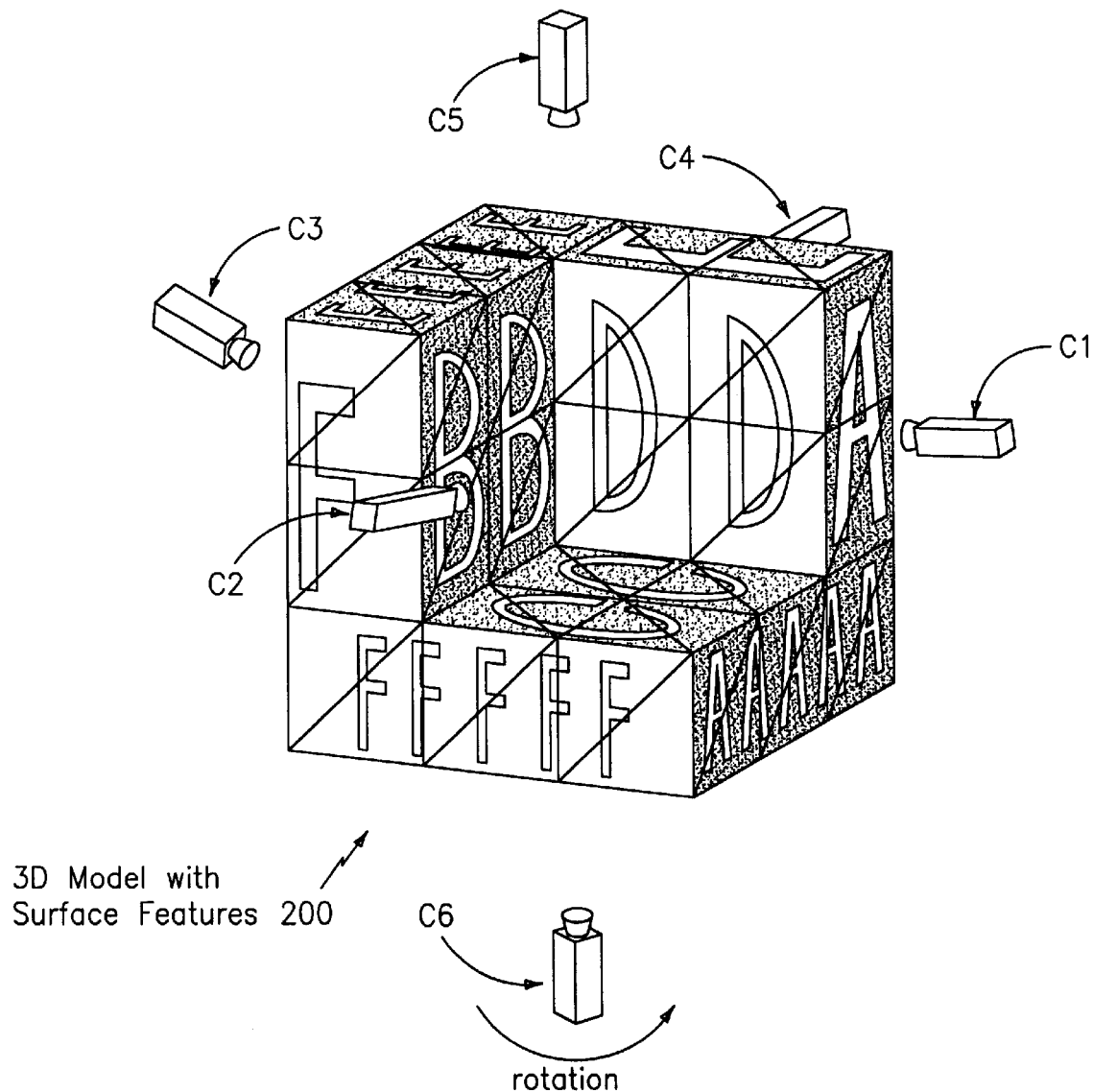
FIG. 7 is a further rotated view of the 3D textured object of FIG. 5c viewed from the second camera and showing the second camera's texture swapped in, wherein the view orientation is closer to the second camera's orientation, according to an embodiment of the present invention.

If the rotation is continued further from that of FIG. 6, until the view direction is now closer to camera two C2 than camera one C1, the client will automatically switch the texture image from that of camera one C1 to that of camera two C2, as shown in FIG. 7. Now regions that were previously occluded, such as 607 in FIG. 6, or backfacing, such as 608 in FIG. 6, become fully visible and fully textured, and from a different direction, as shown in FIG. 7. This shows that if a region of the model is not textured from one direction, it may become textured by rotating the object until those regions are more squarely visible in the new view direction.

Figure 8:
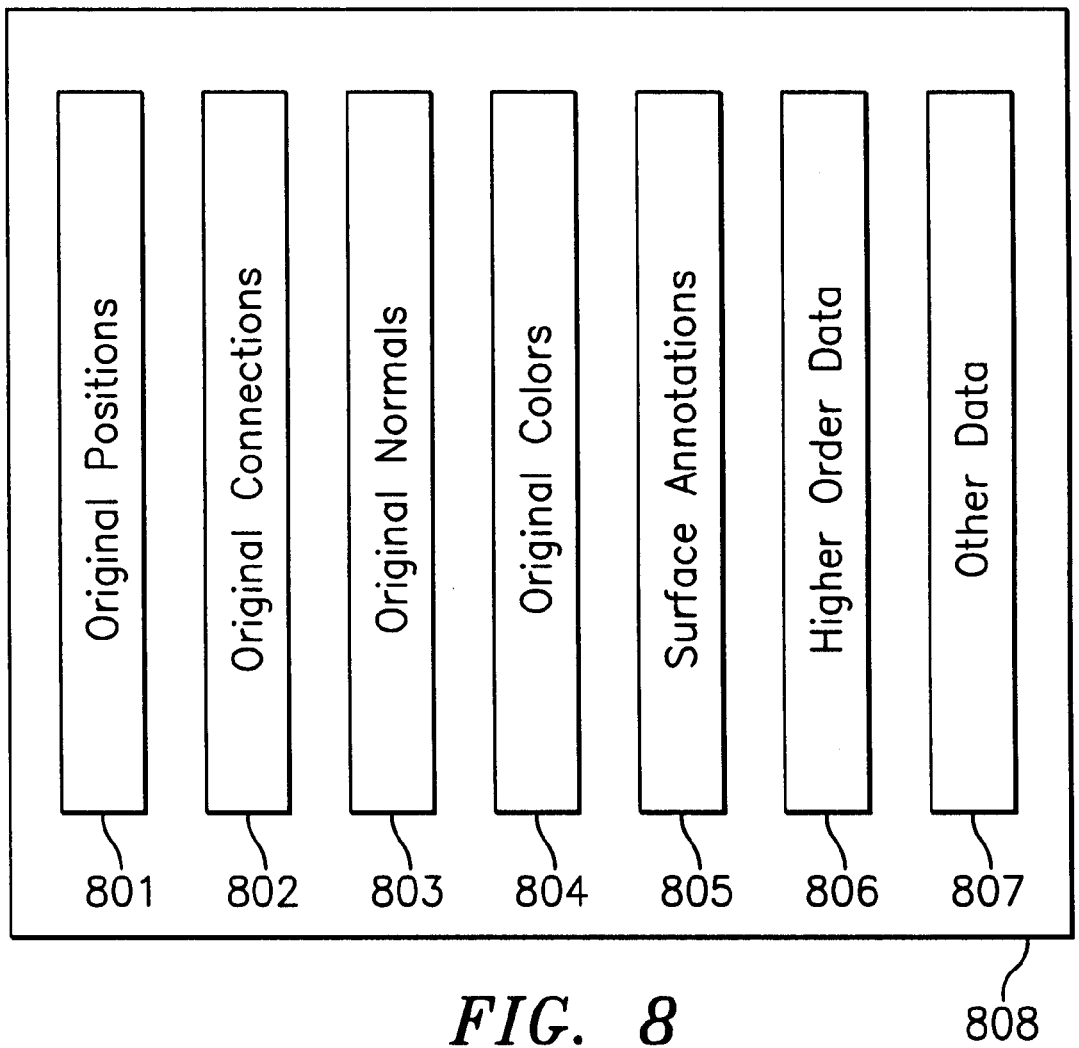
FIG. 8 is an illustration of the data structures that comprise the original 3D model and its renderable features, according to an embodiment of the present invention.

FIG. 8 depicts the components 808 of the original model on the server, including its geometry, surface features and data. The components that are required in the preferred embodiment are the original positions 801 and the original connections 802—which are enough for the client to reconstruct the basic appearance of the object based on its shape. Positions are also referred to as "vertices" or "points" and refer to the actual geometry of the 3D model. Connections refer to the edges that exist between positions. Surface normals 803 may be deduced from the positions and connections themselves or be specified separately in the model in case they differ from what is dictated by the geometry, as is the case when a particular shading effect is desired in the model. The remaining items: original colors 804, which are assigned to the original positions 801, original annotations 805, higher order data 806, and other data 807 are used if available during the rendering process to refine the resulting appearance of the model. Annotations refer to additional notations, such as special symbols to highlight certain positions of the model, thus bringing the viewer's attention to those positions. Higher order data is used when representing high resolution information on a grid with much lower resolution, which sometimes occurs in CAD/CAM applications. Other data is any type of additional information, such as material type, density, stock number, thermal coefficient, etc., which may be embedded in parts of the model. Any information that determines the appearance of the model but does not affect its geometry need not be sent to the client since it will be represented in the texture image that results from rendering.

FIG. 9 shows a typical embodiment 907 of the data structures representing a view camera used to render the model in a particular orientation. The eye point 901 represents a particular point in space from which the model is being viewed, and the view point or direction 902 is either another point that is in the center of the view or the direction vector in which the eye is looking, respectively. The two most common types of views are perspective and orthonormal, and a perspective/orthographic flag 903 indicates which type of view the camera is using. Depending on the value of the perspective/orthographic flag 903, there will be an additional parameter 904 corresponding to the angle of view or the width of the view, if the perspective/orthographic flag is true or false, respectively. The pixel dimensions of the image, X and Y Pixel Count 905, must also be specified in the camera, along with the up direction 906, which specifies a vector used to determine the up direction of the rendered image.

Figure 10:
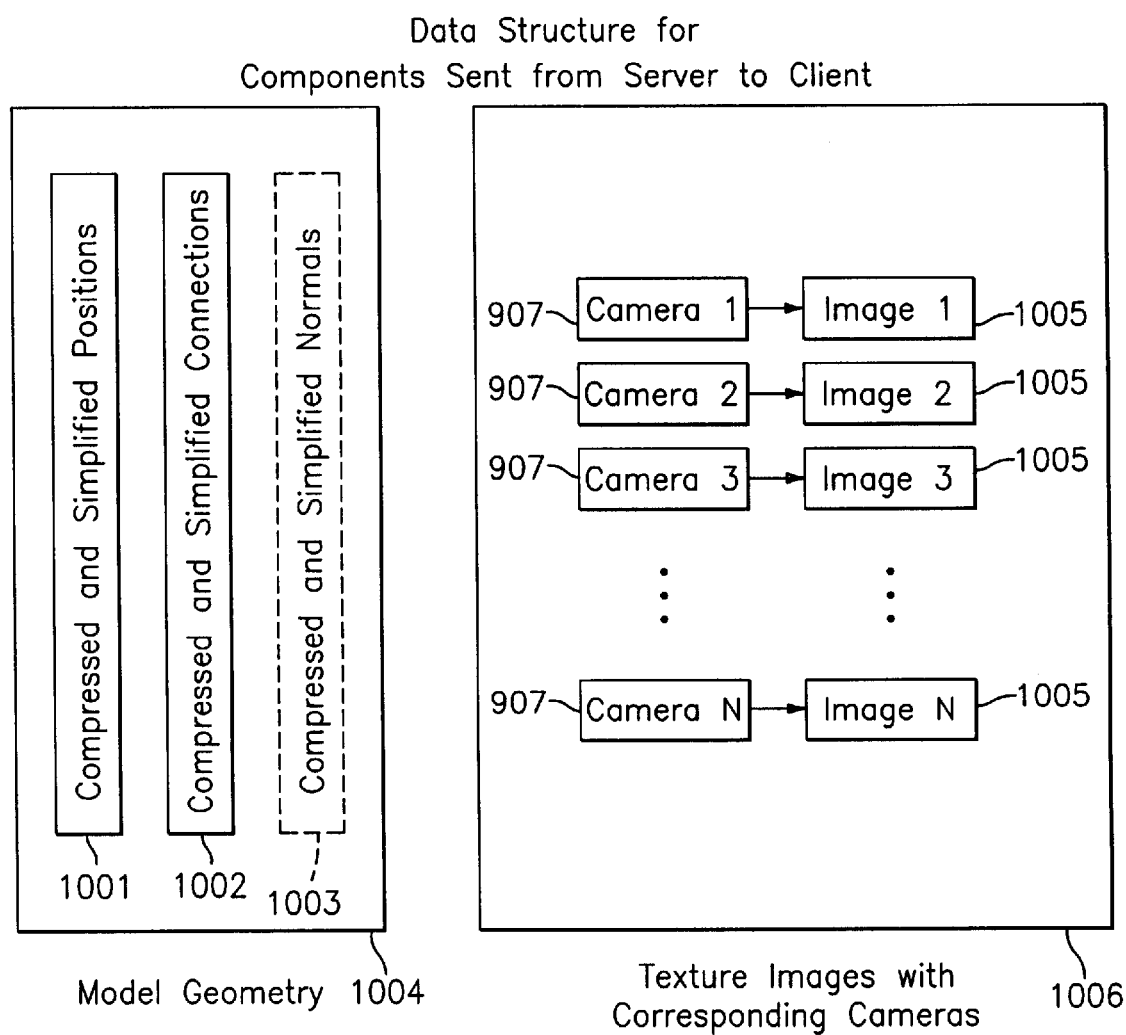
FIG. 10 is an illustration of the data structures that the server sends to the client that allows the client to reconstruct a rotatable model using geometry and a number of camera/image pairs, according to an embodiment of the present invention.

FIG. 10 shows the data structures sent from the server to the client, which typically is a subset of the original model plus a number of texture images and cameras. In the preferred embodiment the original geometry is simplified to reduce the number of polygons to be sent and rendered while retaining the original geometry within some allowed tolerance. The original positions and connections are simplified to simplified positions 1001 and simplified connections 1002. If the surface normals are specified in the model, they are simplified (1003) also and sent. These three components: positions 1001, connections 1002, and normals 1003 comprise the simplified model geometry 1004. A number, N, of view cameras 907 are created based on the model shape and the location of its most important features, and for each camera an image 1005 is rendered of the original model. The set of images and corresponding view cameras comprise the texture images with corresponding cameras 1006 sent with the simplified geometry 1004.

Figure 11:
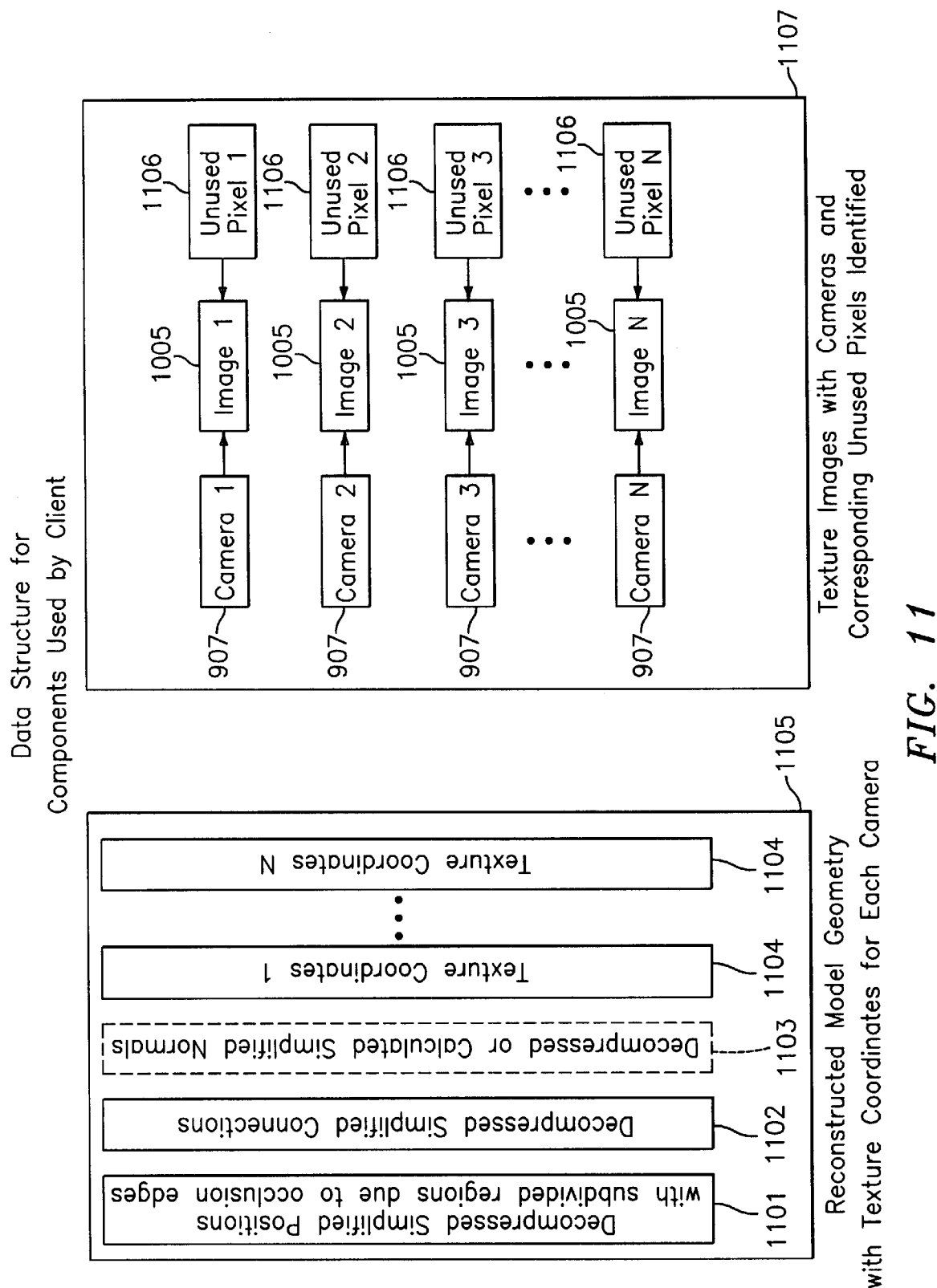
FIG. 11 is an illustration of the data structures created by the client based on the structures shown in FIG. 10, in which the geometric data are decompressed and the texture coordinates are calculated with consideration for occlusion, backfacing and the presence of an unused pixel available in each texture image, according to an embodiment of the present invention.

FIG. 11 shows the data structures for the two main components reconstructed by the client: the model geometry with texture coordinates 1105 and the texture images with associated cameras and unused pixels 1107. The client receives the compressed simplified geometry and decompresses it to create simplified positions 1101, simplified connections 1102, and simplified normals 1103, if provided. The client then takes the first texture image and its associated camera, and identifies a pixel 1106 in the image that does not correspond to a part of the model using projection. The client then uses an occlusion algorithm with the simplified geometry and camera to calculate the texture coordinates 1104 using the scheme depicted in FIG. 5. Once the first texture coordinates have been calculated the model can be displayed using the first camera and texture image, while the others continue to arrive. For each view camera that arrives, the client repeats the occlusion calculation and derives corresponding unused pixels 1106 and texture coordinates 1104. As the new images are processed, the client is able to provide the best available texture if the model rotates to a view direction closer to one of the already processed view cameras.

In the embodiment based on subdividing the regions occluded by edges of the model, the geometry must be processed for each view camera to create a new geometry containing all the subdivided polygons resulting from all the view occlusions. Then the new geometry is texture mapped as before, but this time no polygons are partially occluded; the polygons are either fully visible, fully occluded, or backfaced.

Figure 12:
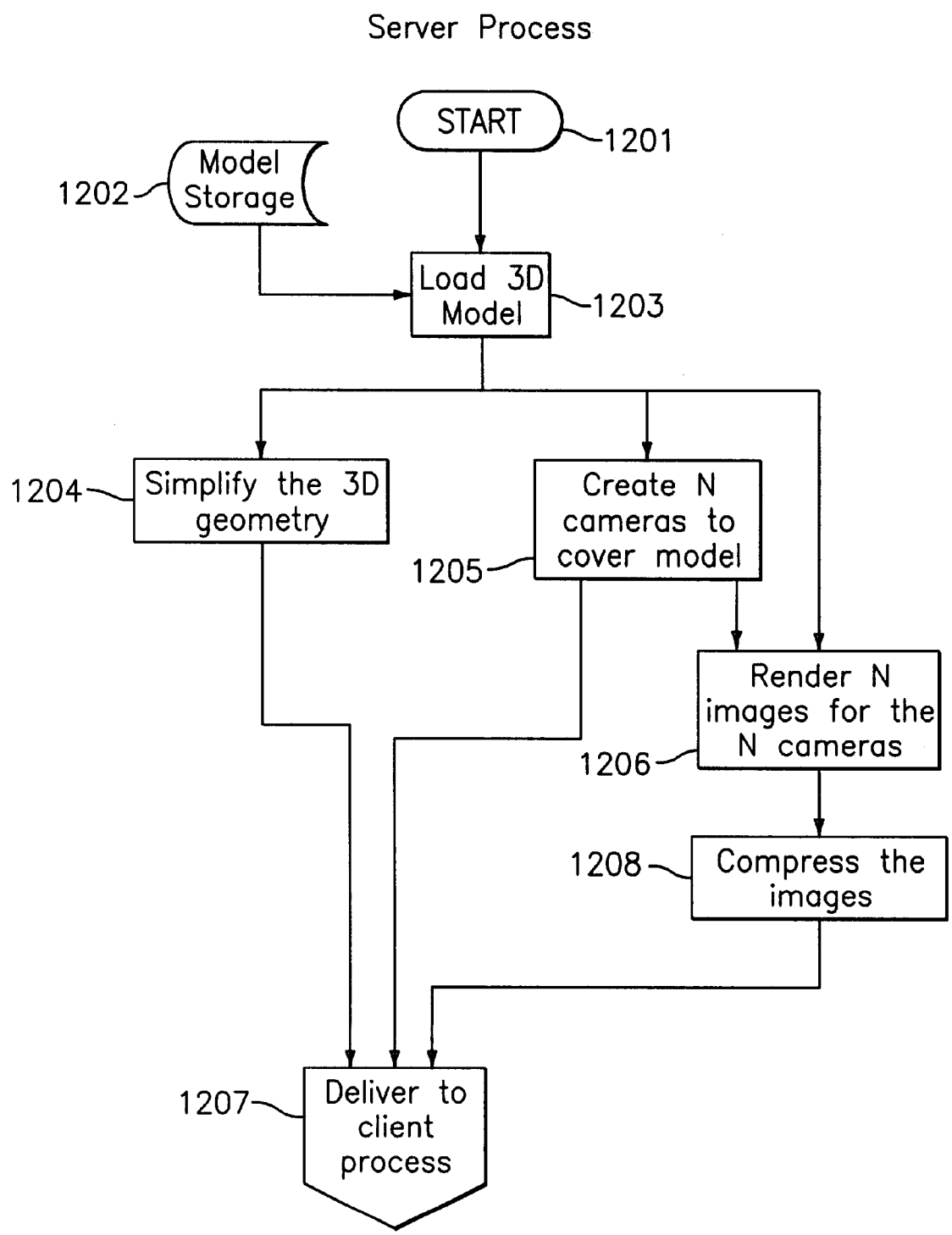
FIG. 12 is a flowchart of the server-side process that simplifies the 3D model's geometry, selects the locations of the cameras for viewing the 3D model, creates the 2D rendered image for each of the cameras, and transmits the information over a network, according to an embodiment of the present invention.

FIG. 12 is a flowchart of the server process that sends the geometry and texture information to the client. The process starts at step 1201 when a 3D model is loaded at step 1203 from storage 1202 on disk or in memory. The geometry is then simplified and compressed at step 1204 in preparation for transmission to the client. A number, N, of cameras is selected to cover the model adequately for display at step 1205. If N is large, many images will have to be rendered and transmitted over the network; if N is small, there may be inadequate texture information, leading to gaps and abrupt discontinuities in the appearance of the model as it is rotated.

A rendering system then creates an image of the model for each of the N cameras at step 1206. Note that the rendering system need not be tightly integrated into the server process; it can be a standalone legacy application with the one requirement that it be able to render the model with a specified camera. The rendering system has its own customized or proprietary visualization techniques based on the data in the model, and the other components of the embodiment, in particular the client that displays the results, are able to present those visualizations without any knowledge of them. In other words, for purposes of this invention, the rendering system can be viewed as a "black box," which receives a 3D model and a camera view as input and outputs a 2D image. However, the rendering process occurs completely on the server side; and is only done for the selected camera views. The decoupling of the server rendering application from the client display process allows the client to be "thinner" and contain no code customized specifically for a particular server rendering application. The server rendering system is preferably a large monolithic legacy system, and, as long as it can create images with a specified camera, the client can drape the results onto the mesh without knowing exactly how the server created the images.

The simplified and compressed geometry, along with the texture images and cameras, are delivered to the client, when they become available, at step 1207. In the preferred embodiment the images are compressed at step 1208 individually and as a collection, to take advantage of the similarity between adjacent views that results in good interframe compression. Sending geometry concurrently with the images allows the client to display something useful to the viewer as soon as it is available. If the geometry arrives first, before any texture images, the geometry can be displayed as a shaded shape with a default color. As the textures arrive, they are draped on the surface based on the current view camera. On the other hand, if the texture image arrives before the geometry, the 2D texture image can be shown to give an immediate sense of the model's appearance prior to the availability of the shape itself.

Figure 13:
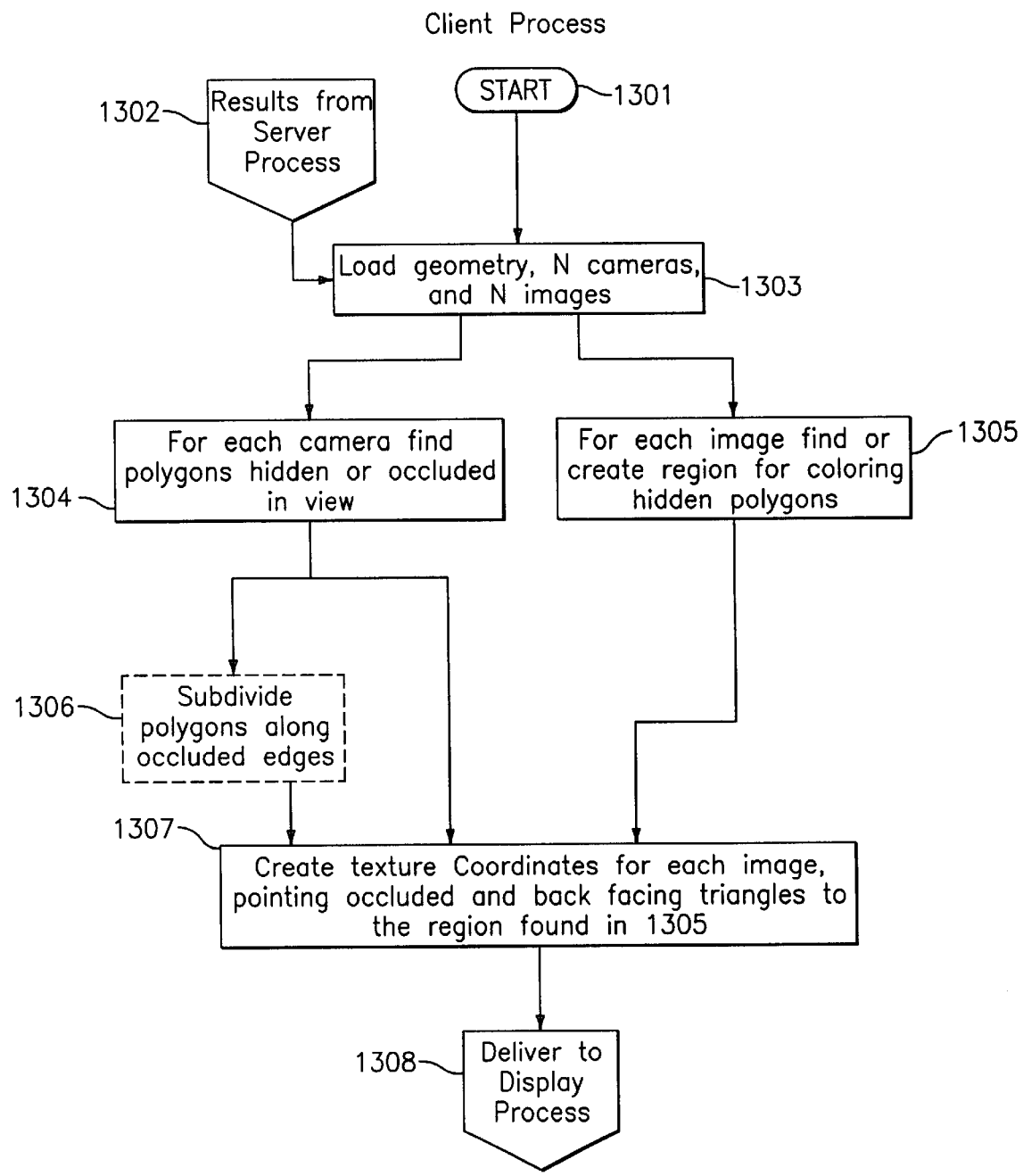
FIG. 13 is a flowchart of the pre-processing performed by the client-side display system that creates the 3D textured object from the 3D model's (simplified) geometry and the 2D rendered images, according to an embodiment of the present invention.

A flowchart showing the client pre-processing algorithm of the preferred embodiment is depicted in FIG. 13. The process starts at step 1301, when results from the server process arrive at step 1302 and the streaming information is decompressed in order to load the geometry, N cameras and N images at step 1303. As described above, for each image, an unused pixel or region must be identified or created for coloring the occluded and backfacing polygons at step 1305. Also, for each camera the polygons that are occluded or backfacing in that view must be identified at step 1304. Optionally, the polygons can be subdivided further based on the occluding edge of the model at step 1306. At step 1307, the results from the last two steps 1304 and 1305 are used to create texture coordinates for each view camera, giving special treatment for polygons that are found occluded or backfacing at step 1304. The occluded and backfacing polygons should texture map to the region in the image assigned in step 1305 and colored to distinguish the polygons that lack texture information from those that are fully textured. Now that the texture coordinates are created, they are delivered to the display process at step 1308.

Figure 14:
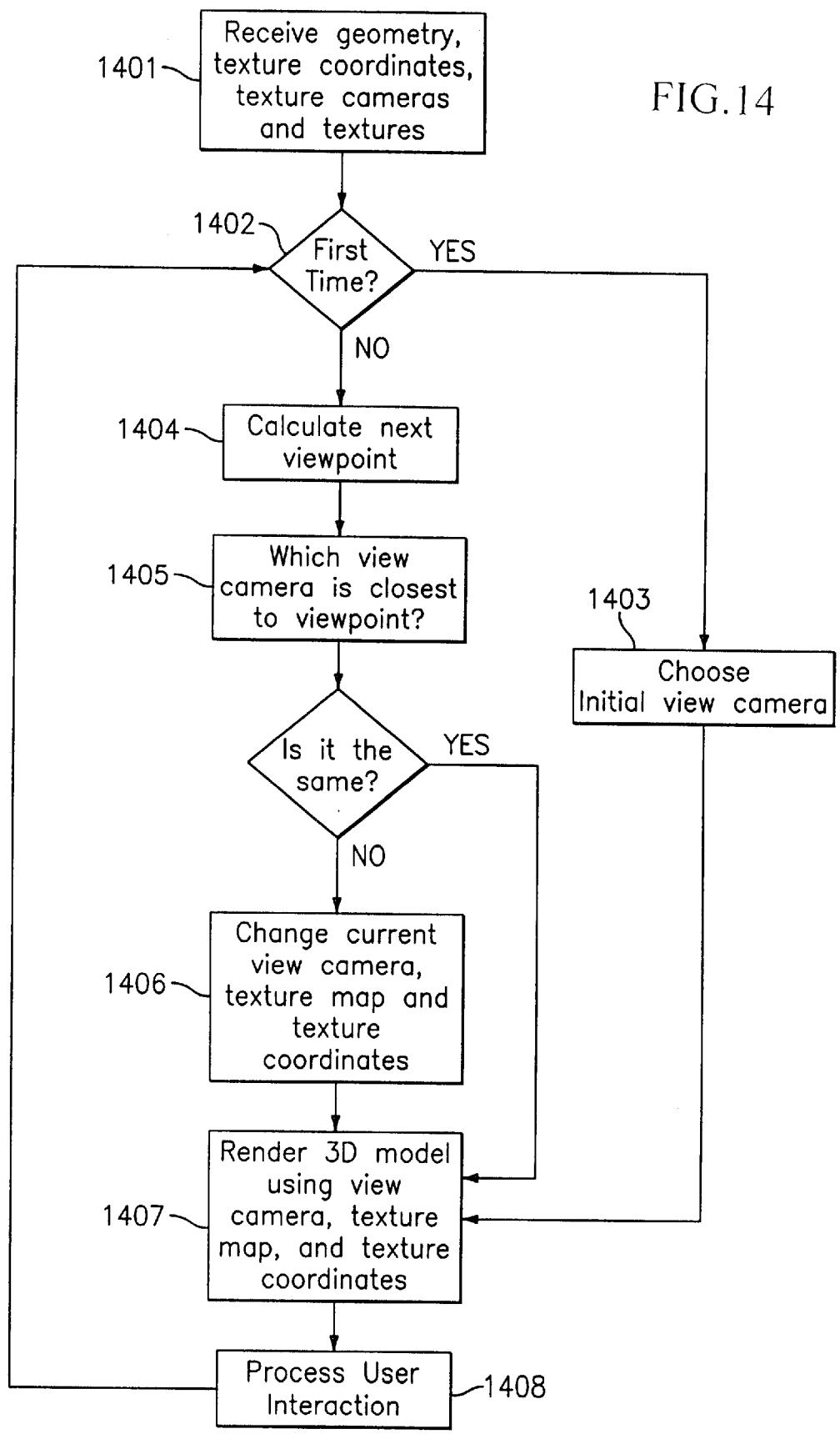
FIG. 14 is a flowchart of the display process performed by the client-side display system that selects the texture corresponding to the camera with the view orientation closest to a current viewing orientation, according to an embodiment of the present invention.

FIG. 14 is a flowchart of the display process performed by the client-side display system according to a preferred embodiment of the present invention. The display process receives the geometry, texture coordinates, texture cameras, and textures from the pre-processing algorithm at step 1401. It is checked whether this is the first time that the model is displayed at step 1402. If the model has not been displayed yet, an initial view camera is chosen at step 1403. The first display will depend upon what information has been received and processed by the client. If the geometry is available for display but there are no texture images, the geometry with shading and default color is displayed. If a texture image is available but not enough geometry has arrived, the texture image can be shown. If this is not the first display of the model at step 1402, the next viewpoint of the user is calculated, at step 1404, based on the previous view camera and user interaction since the last view. Next, at step 1405, it is determined which of the N view cameras is closest to the viewpoint found in step 1404. If the closest view camera to the user's current viewpoint is different than the view camera currently in use, the closer view camera, with its texture coordinates, and texture mapping, is swapped in at step 1406, and the previous view camera is removed. At step 1407, the model is displayed using the current view camera, whether it is a new view camera swapped in at step 1406 or the previous view camera. At step 1408, user interaction is processed and the procedure goes to step 1402.

When the client displays the model locally there is an option of using the normals for smooth shading, faceted shading, or no shading at all. The best choice may depend on the model and the application area, but if the goal is to display the model with as few polygons as possible, yet convey the faceted shading of the original model, there is a fundamental problem in that the simplified model by definition does not contain the polygons corresponding to all the "facets" of the original model. If the model is intended to be displayed with smooth shading the problem is reduced, because the graduation of shading resulting from interpolating adjacent normals tends to smooth over the rougher edges created by simplification. But if the model pertains to CAD/CAM, for example, and the shading of the original facets is desired, this invention provides a unique solution to the problem as described below.

When a model is rendered by the server and displayed on the client, shading is done only once on the combined system. In most cases the server renders the model without shading and the client provides appropriate shading and lighting based on the normals on the model and user preference. This has the advantage that the shading will smoothly change as the 3D model is viewed from different angles. However, the shading may appear coarse, because the client is providing the shading based on simplified geometry. On the other hand, if the original, faceted shading of the original 3D model is desired, the server renders each image with shading enabled. When the client displays the 3D model, the client disables shading and illumination, thus conveying the original, faceted shading in the texture image itself. As the object rotates, the shading remains constant until a new texture camera is closer, at which point a different image is used for the texture map and there is an abrupt change in the shading. Although the abrupt changes in shading may appear jarring at first, the fact that they are linked to changes in view orientation makes it an acceptable sacrifice of quality in order to retain a view of the original model structure.

In many situation the model will have a well-defined shape and the number and location of cameras that provide optimal coverage will be obvious. Furthermore, if the model is being modified in small steps as its design evolves, the ideal set of cameras may remain fixed while the design changes. Note that the cameras need not be evenly spaced; they can be a mixture of uniformly distributed and special cameras located to provide optimal views of known regions of particular interest. In most cases, a non-model-specific algorithm for locating cameras will provide a good and interactive view of the geometry. It is also possible to allow the client to request additional renderings on demand from the server.

One way to guarantee that important views of a model have a good texture image associated with them is to allow the client to request additional texture images on demand. In the embodiment described above, most of the server process can run once per model, pre-rendering the images and compressing the geometry for later streaming to the client. But in addition the client could request new renderings on demand if a particular orientation is important and lacks good texture information on important parts of the model.

Finally, the client and server pieces can work to advantage on a single computer without a network, since the server process creates components that allow the client to view a 3D model with much higher performance while maintaining the appearance of the original model. The reverse is also true: the functions of server and client could be broken up onto different computers in a network. For instance, parallel processing could be used to make renderings of the original 3D model, which would mean different computers or processors would simultaneously perform the same server function. Or the 3D models could be stored on a distributed network and various servers and clients could be working to create images on various user displays.

While the present invention has been described with respect to certain preferred embodiments, it should be understood that the invention is not limited to these particular embodiments, but, on the contrary, the invention is intended to cover all modifications, equivalents, and alternatives falling within the spirit and scope of the invention as defined by the appended claims.

What is claimed is:

1. A computer imaging system having at least one central processing unit (CPU), at least one memory, and at least one network interface to at least one network, the computer imaging system comprising:
   a) at least one model stored in at least one of the memories, the model having geometric features and surface features;
   b) a means for creating a number of camera views around the models;
   c) a means for creating a 2D rendered image of the models for each camera view; and
   d) a means for storing the geometric features, the 2D rendered images, and the respective camera views in at least one of the memories.

2. A computer imaging system as in claim 1, where the stored geometric features, 2D rendered images, and respective camera views are transmitted over at least one network connection.

3. A computer imaging system having at least one central processing unit (CPU), at least one memory, the computer imaging system comprising:
   a) a means for receiving a geometric representation of a 3D model, at least one camera orientation and a 2D rendered image of the 3D model for each camera orientation;
   b) a means for determining which portion of the 3D model's geometric representation, in each of the 2D rendered images, are fully visible, not visible and partially visible from one or more of the respective camera orientations;
   c) a means for creating a "not visible" location indicator that will indicate "not fully visible";
   d) a means for calculating, for each 2D rendered image, one or more texture coordinates of each corner of each portion of the 3D model's geometric representation and substituting the "not visible" location indicator for the portions of the 3D model's geometric representation that are not visible and partially visible, to create a texture map of a 3D textured object; and
   e) a display that displays the 3D textured object.

4. A computer imaging system as in claim 3, wherein the display dynamically selects, as a user is interactively viewing the 3D model, a texture map to use based upon a camera orientation closest to a current view direction of the user.

5. A computer imaging system for producing an interactive image of a three-dimensional (3D) model, comprising:
   a storage means for storing 3D models, said 3D models having geometric features;
   a means for determining at least one viewpoint of one of the 3D models;
   a rendering means for rendering images of the 3D model from each of said viewpoints;
   a processing means for pre-processing the at least one rendering, the at least one viewpoint corresponding to said at least one rendering, and the geometric features of the 3D model, wherein the processing means includes:
      a means for applying a visibility algorithm to determine, for each viewpoint, which portions of the 3D model's geometric features are fully visible, partially occluded, or backfacing;
      a means for mapping, for each viewpoint, the fully visible portions of the 3D model into texture coordinates corresponding to the viewpoint; and
      a means for mapping, for each viewpoint, the remaining geometry to an assigned pixel to represent the lack of texture image data for the viewpoint in the corresponding rendering;
   a display means for displaying the 3D model;
   an input means for at least one user to interact with the 3D model for allowing the user to select a viewpoint of the 3D model;
   a means for determining which viewpoint approximates a viewpoint of the at least one user; and
   a means for creating an image to display on the display means, said image created from the geometric features of the 3D model, the rendering and the mapping of the fully visible portions and the remaining geometry corresponding to the view point which approximates the viewpoint of the at least one user.

6. The computer imaging system of claim 5, further comprising:
   a compression and simplification means for compressing and simplifying said geometric features before the processing means pre-processes said geometric features.

7. The computer imaging system of claim 5, wherein the processing means further comprises a means for assigning at least one pixel of an empty region in the rendering to be the assigned pixel, and assigning the assigned pixel to a color to represent the lack of texture image data for the viewpoint corresponding to said rendering.

8. The computer imaging system of claim 5, wherein the means for creating an image to display on the display means further comprises:
   a means to request from said rendering means additional renderings from additional camera viewpoints.

9. The computer imaging system of claim 5, wherein said computer imaging system comprises a client/server computer system.

10. The computer imaging system of claim 9, wherein said client/server computer system comprises:
    at least one server for preparing 3D model data to be sent to the client, comprising said means for determining at least one viewpoint and said rendering means; and
    at least one client for displaying the 3D model and interacting with at least one user, comprising said processing means, said displaying means, said input means, said means for determining which said at least one viewpoint corresponding to said at least one rendering approximates a viewpoint of the at least one user, and said means for creating an image to display on the display means.

11. The computer imaging system of claim 10, wherein said server produces the renderings without shading and the client provides shading.

12. The computer imaging system of claim 10, wherein said 3D model further has surface features and said server produces the renderings with faceted shading and the client disables shading and illumination, thereby displaying the 3D model with original surface features and shading.

13. A computer-based interactive three-dimensional (3D) imaging method comprising the steps of:
    a) storing one or more 3D models, the 3D models having geometric features and surface features;
    b) selecting a plurality of viewpoints on a 3D model taken from storage;

c) producing a 2D rendering of the 3D model for each of said plurality of viewpoints;

d) transmitting the geometry, the renderings, and respective viewpoints to an imaging means;

e) producing an image of the 3D model for each respective viewpoint based on the geometric features and rendering on the imaging means;

f) selecting an initial viewpoint and displaying its corresponding image on a display means;

g) interacting with at least one user through an input means, said input means allowing the at least one user to change the at least one user's viewpoint on the 3D model;

h) selecting which of said plurality of viewpoints approximates a user's current viewpoint;

i) disabling shading and illumination at the imaging means when the surface features include shading; and j) displaying the image corresponding to the selected viewpoint on the display means.

14. The computer-based interactive three-dimensional (3D) imaging method of claim 13, further comprising the step of:

compressing and simplifying said geometric features.

15. The computer-based interactive three-dimensional (3D) imaging method of claim 13, further comprising the steps of:

applying a visibility algorithm to determine which portions of the 3D model's geometric features are fully visible, partially occluded, or backfacing;

assigning at least one pixel of an empty region in the rendering to a color to represent the lack of texture image data for the viewpoint corresponding to said rendering;

mapping the fully visible portions of the 3D model into texture coordinates corresponding to the current at least one user viewpoint; and mapping the remaining geometry to the at least one assigned pixels.

16. The computer-based interactive three-dimensional (3D) imaging method of claim 13, further comprising the step of:

performing step (c) when additional renderings are required.

17. The computer-based interactive three-dimensional (3D) imaging method of claim 13, further including the step of performing steps a–j on a plurality of processing means in at least one network.

18. A computer imaging system for producing an interactive image of a three-dimensional (3D) model, said computer imaging system comprising:

a processing means for pre-processing at least one 2D rendering of a 3D model, a viewpoint corresponding to each of said at least one 2D rendering, and geometric features of the 3D model, said processing means including:

a means for applying a visibility algorithm to determine, for each viewpoint, which portions of the 3D model's geometric features are fully visible, partially occluded, or backfacing;

a means for mapping, for each viewpoint, the fully visible portions of the 3D model into texture coordinates corresponding to the viewpoint; and a means for mapping, for each viewpoint, the remaining geometry to an assigned pixel to represent the lack of texture image data for the viewpoint in the corresponding rendering;

a display means for displaying the 3D model;

an input means for at least one user to interact with the 3D model;

a means for determining which viewpoint of said at least one viewpoint approximates a viewpoint of the at least one user; and a means for creating an image to display on the display means, said image created from the geometric features of a 3D model and the at least one 2D rendering and the mapping of the fully visible portions and remaining geometry corresponding to the viewpoint which approximates the viewpoint of the at least one user.

19. A computer imaging system for producing an interactive image of a three-dimensional (3D) model, said computer imaging system comprising:

a means for applying a visibility algorithm to determine which portions of a 3D model's geometric features are fully visible, partially occluded, or backfacing in a rendering of the 3D model;

a means for assigning at least one pixel of an empty region in the rendering to a color to represent the lack of texture image data for the viewpoint corresponding to said rendering;

a means for mapping the fully visible portions of the 3D model into texture coordinates corresponding to a current user viewpoint; and a means for mapping the remaining geometry to the at least one assigned pixels.

20. A computer-based interactive three-dimensional (3D) imaging method, said method being tangibly embodied in a program of instructions readable and executable by a machine, comprising the steps of:

a) storing one or more 3D models, the 3D models having geometric features and surface features including shading;

b) selecting a plurality of viewpoints on a 3D model taken from storage;

c) producing a 2D rendering of the 3D model for each of said plurality of viewpoints;

d) transmitting the geometry, the renderings, and respective viewpoints to an imaging means;

e) producing an image of the 3D model for each respective viewpoint based on the geometric features and rendering on the imaging means;

f) selecting an initial viewpoint and displaying its corresponding image on a display means;

g) interacting with at least one user through an input means, said input means allowing the at least one user to change the at least one user's viewpoint on the 3D model;

h) selecting which of said plurality of viewpoints approximates a user's current viewpoint; and i) disabling shading and illumination at the imaging means when the surface features include shading; and j) displaying the image corresponding to the selected viewpoint on the display means.

* * * * *